(12) United States Patent
Meng et al.

(10) Patent No.: US 10,638,061 B2
(45) Date of Patent: Apr. 28, 2020

(54) ACTIVE-PIXEL IMAGE SENSOR

(71) Applicant: Analog Devices Global Unlimited Company, Hamilton (BM)

(72) Inventors: Libo Meng, Shanghai (CN); Alexander Policht, South Boston, MA (US)

(73) Assignee: ANALOG DEVICES GLOBAL UNLIMITED COMPANY, Hamilton (BM)

( * ) Notice: Subject to any disclaimer, the term of this patent is extended or adjusted under 35 U.S.C. 154(b) by 38 days.

(21) Appl. No.: 16/134,035

(22) Filed: Sep. 18, 2018

(65) Prior Publication Data
US 2020/0092498 A1 Mar. 19, 2020

(51) Int. Cl.
*H04N 5/341* (2011.01)
*G02B 27/30* (2006.01)
*G02B 27/09* (2006.01)

(52) U.S. Cl.
CPC ......... *H04N 5/341* (2013.01); *G02B 27/0944* (2013.01); *G02B 27/30* (2013.01)

(58) Field of Classification Search
CPC .............. H04N 5/341; H04N 5/23287; H04N 5/23277; H04N 5/349; H04N 9/045; H04N 9/646; H04N 13/218; H04N 13/232; H04N 2209/045; G02B 27/0944; G02B 27/30; G02B 26/005; G02B 5/06; G02B 5/201; G02B 3/0006; G02B 6/4249; G02B 6/2706; G02B 6/2793; G02B 6/2931; G02B 6/29311; G02B 6/29397; G02B 6/425; G06T 3/4053; G06T 3/4069; G06T 3/4015; H01L 27/14621; H01L 27/14645; G01S 7/4865; G01S 7/4863; G01S 7/4861; G01S 17/105; G01J 3/32; G01J 3/021; G01J 3/0224; H04J 14/02; H04J 14/08
USPC ....................................................... 348/302
See application file for complete search history.

(56) References Cited

U.S. PATENT DOCUMENTS

| | | | |
|---|---|---|---|
| 6,753,960 B1 * | 6/2004 | Polynkin | G01J 3/02 356/330 |
| 7,177,496 B1 | 2/2007 | Polynkin et al. | |
| 10,036,625 B2 * | 7/2018 | Baets | G01J 3/32 |
| 2010/0149073 A1 * | 6/2010 | Chaum | G02B 27/0093 345/8 |
| 2010/0149313 A1 * | 6/2010 | Kroll | G03H 1/2294 348/40 |
| 2011/0149359 A1 * | 6/2011 | Leister | G02B 27/46 359/9 |

(Continued)

*Primary Examiner* — Pritham D Prabhakher
(74) *Attorney, Agent, or Firm* — Patent Capital Group

(57) ABSTRACT

There is provided an active-pixel image sensor that uses a method of offsetting and interleaving to increase its resolution. In a basic configuration of the active-pixel image sensor, light from one optical transmitter is diffracted to create one diffraction pattern, and then light from another optical transmitter is diffracted to create another diffraction pattern. Light from further optical transmitters may also be diffracted to create further diffraction patterns sequentially after that. These diffraction patterns are offset from one another and then interleaved using time division multiplexing so as to create a single pixel output that has higher resolution than is feasible with an active-pixel image sensor that only utilizes one optical transmitter per pixel or that does not use diffraction patterns to create a larger field of view.

20 Claims, 7 Drawing Sheets

(56) References Cited

U.S. PATENT DOCUMENTS

| | | | |
|---|---|---|---|
| 2013/0278939 A1* | 10/2013 | Pfister | G01B 11/25 356/601 |
| 2014/0055692 A1* | 2/2014 | Kroll | G02F 1/1347 349/15 |
| 2014/0118737 A1* | 5/2014 | Martinelli | G02B 6/29395 356/326 |
| 2014/0168485 A1 | 6/2014 | Hiramoto et al. | |
| 2016/0037114 A1 | 2/2016 | Mandelli et al. | |
| 2016/0327776 A1 | 11/2016 | Tsia et al. | |
| 2017/0082421 A1* | 3/2017 | Baets | G01J 3/433 |
| 2017/0109865 A1* | 4/2017 | Kim | G02B 5/201 |
| 2019/0339364 A1* | 11/2019 | Nash | G01S 7/4865 |

* cited by examiner

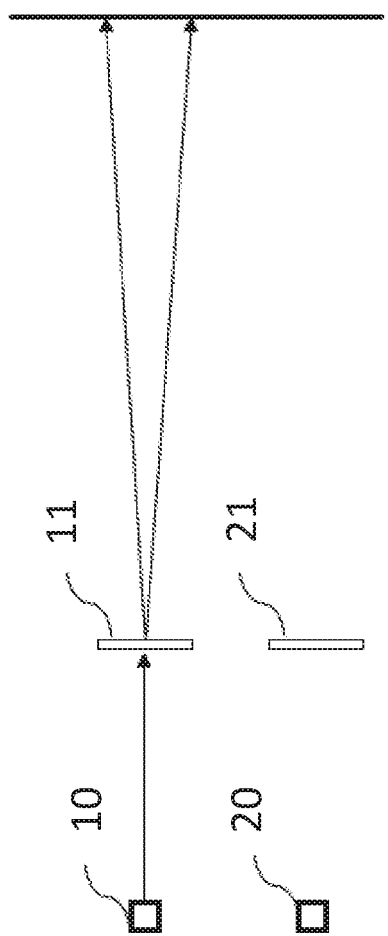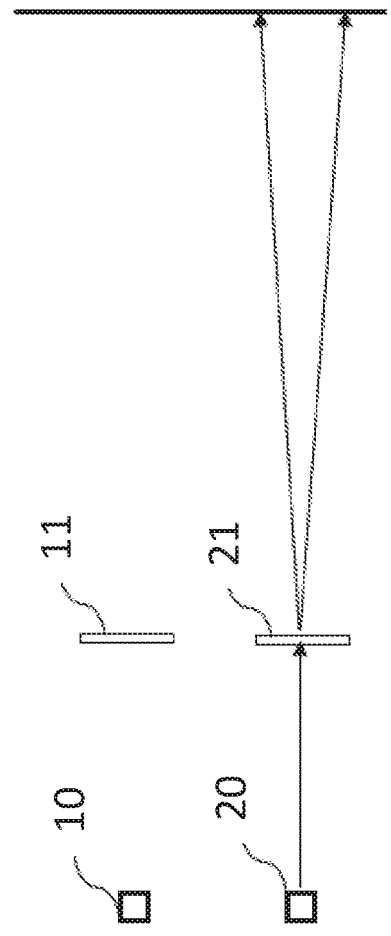

| A | B | A | B | A | B | A | B | A | B | A | B |
|---|---|---|---|---|---|---|---|---|---|---|---|
| C | D | C | D | C | D | C | D | C | D | C | D |
| A | B | A | B | A | B | A | B | A | B | A | B |
| C | D | C | D | C | D | C | D | C | D | C | D |
| A | B | A | B | A | B | A | B | A | B | A | B |
| C | D | C | D | C | D | C | D | C | D | C | D |

Fig. 4

```
ABABAB  C  ABABAB  C  ABABAB  C
C  ABABAB  C  ABABAB  C  ABABAB  C
ABABAB  C  ABABAB  C  ABABAB  C
C  ABABAB  C  ABABAB  C  ABABAB  C
```

ACTIVE-PIXEL IMAGE SENSOR

TECHNICAL FIELD OF THE DISCLOSURE

The present disclosure relates to the field of active-pixel image sensors and more particularly, but not exclusively, it relates to active-pixel image sensors having increased resolution.

BACKGROUND

An image sensor is a sensor that detects and conveys image information by converting light into electrical signals. An active-pixel image sensor is a sensor in which each pixel has its own photodetector and an active amplifier.

One popular image sensor is the complementary metal-oxide-semiconductor (CMOS) sensor, which has overtaken other image sensor technology in many consumer applications due to its high noise immunity, low static power consumption and low cost.

In a typical CMOS image sensor, there is a 2D array of pixels, and each pixel includes a photodetector and an active amplifier. Light impacting upon each pixel causes electrical charges to accumulate on the pixels and an accumulated charge is read and transferred to signal processing circuitry. The accumulated charge may then be amplified by individual amplifiers at each pixel before being output as a voltage signal.

BRIEF DESCRIPTION OF THE DRAWINGS

To provide a more complete understanding of the present disclosure and features and advantages thereof, reference is made to the following description, taken in conjunction with the accompanying Figures, wherein like reference numerals represent like parts, in which:

FIGS. 2A and 2B are schematic diagrams of an active-image pixel sensor in accordance with a second example of the present disclosure;

FIG. 4 shows a uniform combined diffraction pattern in accordance with a fourth example of the present disclosure;

FIG. 5 shows a non-uniform combined diffraction pattern in accordance with a fifth example of the present disclosure;

FIG. 6 shows a non-uniform combined diffraction pattern in accordance with a sixth example of the present disclosure.

DESCRIPTION OF EXAMPLE EMBODIMENTS OF THE DISCLOSURE

Overview

Figure 1:
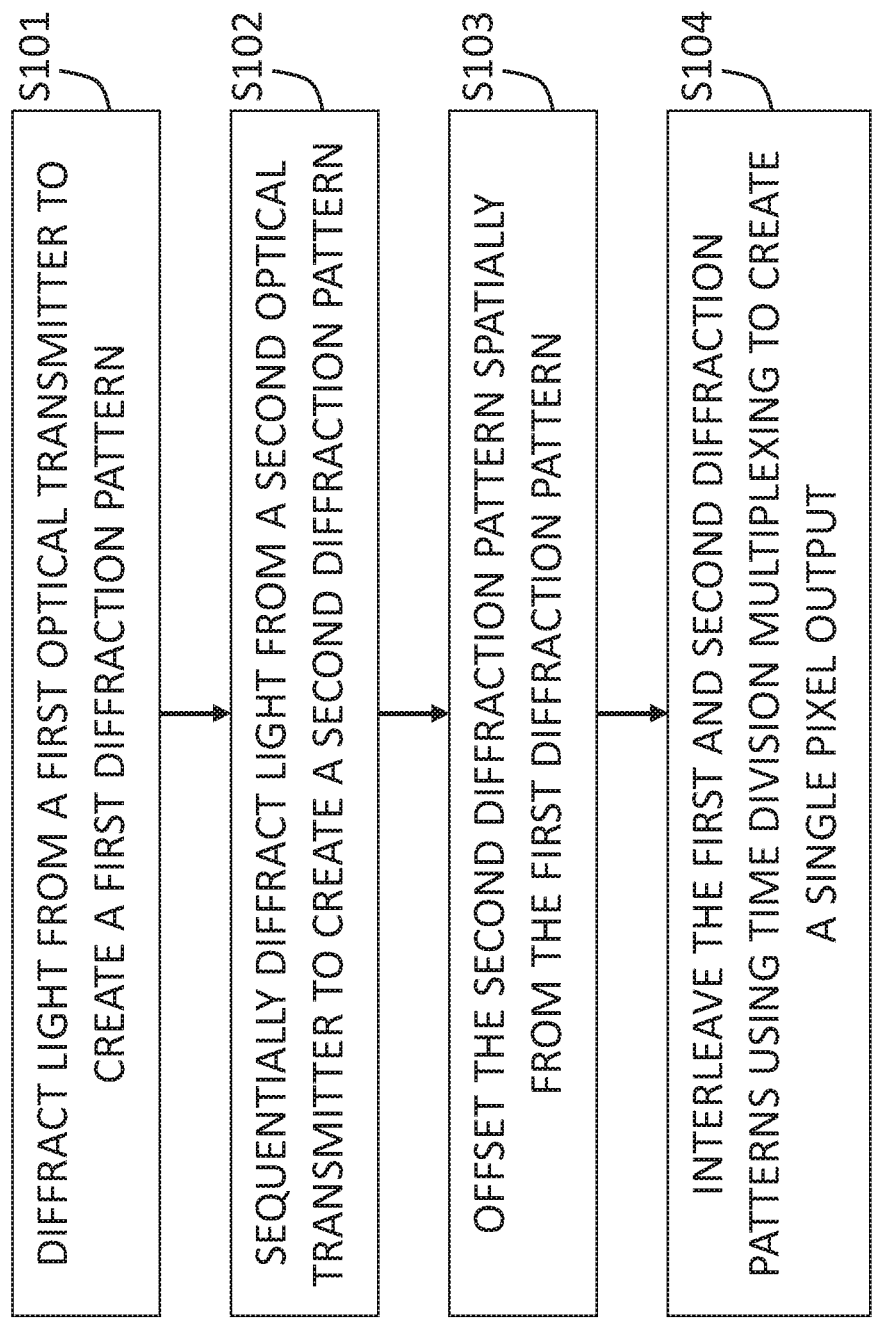
FIG. 1 is a flow chart that illustrates a method in accordance with a first example of the present disclosure.

There is provided an active-pixel image sensor that uses a method of offsetting and interleaving to increase its resolution. In a basic configuration of the active-pixel image sensor, light from one optical transmitter is diffracted to create one diffraction pattern, and then light from another optical transmitter is diffracted to create another diffraction pattern. Light from further optical transmitters may also be diffracted to create further diffraction patterns sequentially after that. These diffraction patterns are offset from one another and then interleaved using time division multiplexing so as to create a single pixel output that has higher resolution than is feasible with an active-pixel image sensor that only utilizes one optical transmitter per pixel or that does not use diffraction patterns to create a larger field of view.

According to a first aspect of the disclosure, there is provided a method of increasing the resolution of an active-pixel image sensor, comprising: diffracting light from a first optical transmitter to create a first diffraction pattern; sequentially diffracting light from a second optical transmitter to create a second diffraction pattern; offsetting the second diffraction pattern spatially from the first diffraction pattern; and interleaving the first and second diffraction patterns using time division multiplexing to create a single pixel output.

Preferably, the first and second optical transmitters are collimated lasers and the active-pixel image sensor is a solid state active-pixel image sensor, for example, a CMOS sensor.

The combination of offsetting diffraction patterns from at least two different light sources and using time division multiplexing to combine the diffraction patterns provides for increased resolution of the active-pixel image sensor since light from each optical transmitter is scattered into a dots matrix (thus increasing the resolution by the number of dots created) and then the plurality of dots matrices are interleaved in the time domain (thus further increasing the resolution by the number of optical transmitters).

The result is a reliable and easy to maintain active-pixel image sensor that can be made in a less expensive way than previous active-pixel images sensors of the same resolution. Advantageously, the method of increasing the resolution of an active-pixel image sensor as presently claimed can be combined with previous methods such as mechanical scanning, optical waveguide or optical phase array techniques to further optimize results.

In some examples, diffracting light from the first and second optical transmitters may comprise diffracting light from each of the first and second optical transmitters through the same diffraction grating. In this case, the diffraction pattern formed from each optical transmitter will be the same and the offsetting will determine the exact configuration of the combined diffraction pattern over the field of view of the pixel, for example, to avoid overlap of dots in the diffraction patterns and to also avoid gaps in between the dots so as to maximize resolution of the active-pixel image sensor, or to cause overlap of dots in some areas in order to increase the intensity of the output in these areas.

The "combined diffraction pattern" may be defined as the interleaved diffraction pattern that comprises the overlaid individual diffraction patterns of each of the optical transmitters in the absence of time division multiplexing.

In other examples, diffracting light from the first and second optical transmitters may comprise diffracting light from the first and second optical transmitters through different diffraction gratings. In this case, the diffraction pattern formed through the different diffraction gratings may be the same or they may be different. If the diffraction patterns formed from each of the optical transmitters are the same, then the resulting combined diffraction pattern may be the same as in the example where a single diffraction grating is used (provided that the plurality of diffraction gratings are aligned so as to allow this).

As well as offsetting in a particular way, it may be advantageous to align the plurality of diffraction gratings so as to offset the diffraction patterns in a particular way. For example, the plurality of diffraction gratings could be aligned to avoid overlap of dots in the diffraction patterns and to also avoid gaps in between the dots so as to maximize resolution of the active-pixel image sensor. On the other hand, the plurality of diffraction gratings could be aligned to overlap the dots in some areas in order to increase the intensity of the output in these areas, which may be advantageous in some applications.

In some examples, offsetting the second diffraction pattern from the first diffraction pattern may comprise offsetting to create a combined diffraction pattern at the single pixel output that is uniform. By "uniform", it is meant that the gap or space between each dot in the combined diffraction pattern is equal or consistent. Uniform combined diffraction patterns provide for high resolution outputs that are highly efficient in terms of covering the entire field of view of the pixel.

In other examples, offsetting the second diffraction pattern from the first diffraction pattern may comprise offsetting to create a combined diffraction pattern at the single pixel output that is non-uniform. By "non-uniform", it is meant that the gap or space between each dot in the combined diffraction pattern is not equal or consistent. It will be appreciated it is possible to create a uniform pattern from each of the optical transmitters, but to create a non-uniform combined diffraction pattern due to the offsetting of the individual diffraction patterns.

According to a second aspect of the disclosure, there is provided an active-pixel image sensor, comprising: a first optical transmitter; a second optical transmitter; a diffraction grating; and optical transmitter control circuitry arranged to pass light from the first and second optical transmitters sequentially through the diffraction grating to create a first and second diffraction pattern, respectively, to offset the second diffraction pattern spatially from the first diffraction pattern, and to interleave the first and second diffraction patterns using time division multiplexing to create a single pixel output.

Preferably, the first and second optical transmitters are collimated lasers and the active-pixel image sensor is a solid state active-pixel image sensor, for example, a CMOS sensor.

In some examples, the single pixel output comprises a combined diffraction pattern that is uniform. In other examples, the single pixel output comprises a combined diffraction pattern that is non-uniform. The meaning of the terms "uniform" and "non-uniform" are described above in relation to the first aspect of the disclosure above.

In a preferred example, the first and second diffraction patterns are quadrilateral. The combined diffraction pattern may also be quadrilateral.

In another preferred example, the first and second diffraction patterns are hexagonal. The combined diffraction pattern may also be hexagonal. This shape of combined diffraction pattern may provide improve efficiency to cover the field of view of the single pixel output.

According to a third aspect of the disclosure, there is provided an active-pixel image sensor, comprising: a first optical transmitter; a second optical transmitter; a plurality of diffraction gratings; and optical transmitter control circuitry arranged to pass light from the first and second optical transmitters sequentially through the plurality of diffraction gratings to create a first and second diffraction pattern, respectively, to offset the second diffraction pattern spatially from the first diffraction pattern, and to interleave the first and second diffraction patterns using time division multiplexing to create a single pixel output.

Preferably, the first and second optical transmitters are collimated lasers and the active-pixel image sensor is a solid state active-pixel image sensor, for example, a CMOS sensor.

In the active-pixel image sensor according to the third aspect of the disclosure, there are at least two diffraction gratings. Light from the first and second optical transmitters may each be passed through different diffraction gratings. If there are more optical transmitters in the active-pixel image sensor, then light from each optical transmitter may be passed through a different diffraction grating.

In this case, the diffraction pattern formed by each diffraction grating may be the same or they may be different. If the diffraction patterns formed from each of the optical transmitters is the same, then the resulting combined diffraction pattern may be the same as in the example where a single diffraction grating is used (provided that the plurality of diffraction gratings are aligned so as to allow this). It may be advantageous to align the plurality of diffraction gratings so as to offset the diffraction patterns in a particular way. For example, the plurality of diffraction gratings could be aligned to avoid overlap of dots in the diffraction patterns and to also avoid gaps in between the dots so as to maximize resolution of the active-pixel image sensor. On the other hand, the plurality of diffraction gratings could be aligned to overlap the dots in some areas in order to increase the intensity of the output in these areas, which may be advantageous in some applications.

In some examples, the single pixel output comprises a combined diffraction pattern that is uniform. In other examples, the single pixel output comprises a combined diffraction pattern that is non-uniform. The meaning of the terms "uniform" and "non-uniform" are described above in relation to the first aspect of the disclosure above.

In a preferred example, the first and second diffraction patterns are quadrilateral. The combined diffraction pattern may also be quadrilateral.

In another preferred example, the first and second diffraction patterns are hexagonal. The combined diffraction pattern may also be hexagonal. This shape of combined diffraction pattern may provide improve efficiency to cover the field of view of the single pixel output.

According to a fourth aspect of the disclosure, there is provided an apparatus comprising the active-pixel image sensor as described above. The apparatus may also comprise a transmission lens to further reshape the pattern and its field of incidence in front of the plurality of diffraction grating lens; a receiver optical lens to adjust the field of view of the image sensor matrix; an analog front end chip for synchronizing the timing between optical transmitters and digitalizing the analog signals from the image sensor; a system controller for controlling the analog front end chip and interfacing to cooperate with other upper level systems, such that a digital signal processor can merge the time division multiplexing images.

Challenges to Increasing Resolution

Increasing the resolution of CMOS sensors as well as other active-pixel image sensors is an ongoing challenge. Some efforts to increase the resolution of solid state active-pixel image sensors have primarily been focused on mechanical scanning techniques, such as detection and ranging (LIDAR), using microelectromechanical system (MEMS) actuators or motors. However, a problem with mechanical scanning techniques is that there is a need to recalibrate the optical paths every six months or so due to the mechanical movements in the system. Further, MEMS devices such as scanning mirrors are vulnerable to shock and impacts to the suspension.

In other attempts to increase resolution, optical waveguide or optical phase array techniques have been used. Since these techniques are not based upon small mechanical moving parts, they are able to tolerate shock better. However, their energy dissipation and thus power consumption is relatively high, with optical waveguide techniques having up to 60% heat dissipation and optical phase array techniques having up to 90%+ heat dissipation, which leads to more expensive sensors. Further, if the sensor materials are sensitive to heat, then there is a risk that they will be burned due to the high heat dissipation.

Therefore, there is a need for improvements in active-pixel image sensors.

Improved Active-Image Pixel Sensor

It has been recognized that an active-pixel image sensor with increased resolution, reduced heat dissipation and reduced need for re-calibration during its lifetime is desired.

In the present disclosure, vast improvements to the resolution of an active-pixel image sensor are made using a combination of diffraction and time division multiplexing techniques.

This is achieved by having a first optical transmitter, a second optical transmitter, one or more diffraction gratings, and optical transmitter control circuitry. The optical control circuitry is arranged to pass light from the first and second optical transmitters sequentially through the diffraction grating(s) to create a first and second diffraction pattern, respectively, to offset the second diffraction pattern spatially from the first diffraction pattern, and to interleave the first and second diffraction patterns using time division multiplexing to create a single pixel output.

Importantly, the diffraction grating (preferably in the form of a diffraction grating lens) reshapes the field of illumination of each transmitter from a continuous area to scattered spots so that each of the scattered spots illuminates a part of the area of one pixel in the receiver's field of view. Then, by using time division multiplexing, it is ensured that the scattered spots of each of the transmitters cover the full area of the pixel.

Using the above technique of the present disclosure, the resolution of the solid state active-pixel image sensor can be improved many-fold, depending on the number of optical transmitters and the scattering pattern caused by the diffraction grating lens. Active-pixel image sensors of the present disclosure is particularly useful in 3D LIDAR applications and also structured light applications in hybrid depth sensing systems as well as 1D and 2D applications such as active lighting.

FIG. 1 is a flow chart that illustrates the basic method by which a first example of the present disclosure may be implemented in order to increase the resolution of an active-pixel image sensor.

At S101, light is diffracted from a first optical transmitter to create a first diffraction pattern.

At S102, light is sequentially diffracted from a second optical transmitter to create a second diffraction pattern.

When the first and second optical transmitters are collimated lasers, then one or more diffraction gratings may be used to scatter light from each of the collimated lasers into a dots matrix.

At S103, the second diffraction pattern is spatially offset from the first diffraction pattern.

When light from the first and second optical transmitters are diffracted through the same diffraction grating, offsetting may be performed by refracting the first and/or second diffraction pattern using a refracting lens, for example. When light from the first and second optical transmitters are diffracted though different diffraction gratings, the first and second diffraction patterns may already be offset.

Finally, at S104, the first and second diffraction patterns are interleaved using time division multiplexing to create a single pixel output. Since the first and second diffraction patterns are created sequentially rather than simultaneously, read-out of the pixel output is achieved using time division multiplexing.

FIGS. 2A and 2B illustrate an active-pixel image sensor according to a second example of the disclosure. As shown in FIG. 2A, light is diffracted from a first optical transmitter 10 through a first diffraction grating 11 to create a first diffraction pattern. Then, sequentially, as shown in FIG. 2B, light is diffracted from a second optical transmitter 20 through a second diffraction grating 21 to create a second diffraction pattern. The first and second diffraction patterns may be the same or they may be different, depending on the configuration of the first and second diffraction gratings. The first and second diffraction patterns may already be sufficiently offset from one another by virtue of the chosen alignment of the first and second diffraction gratings. Alternatively, the second diffraction pattern may be offset further, for example, using a refracting lens. Finally, the output of the pixel is read out using time division multiplexing so that the effective resolution of the pixel is the combination of the resolutions of the first and second diffraction patterns.

Figure 3A:
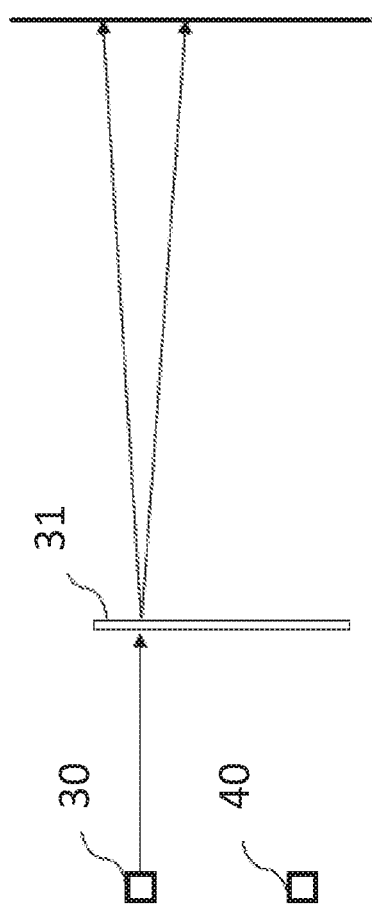
FIGS. 3A and 3B are schematic diagrams of an active-image pixel sensor in accordance with a third example of the present disclosure.
Figure 3B:
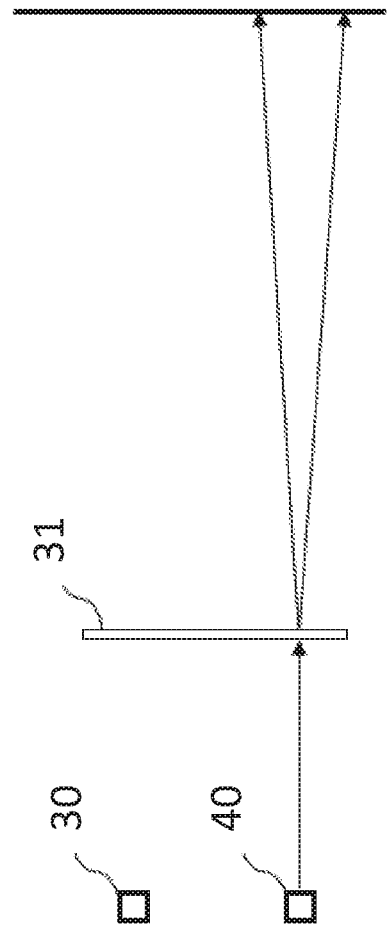

FIGS. 3A and 3B illustrate an active-pixel image sensor according to a third example of the disclosure. As shown in FIG. 3A, light is diffracted from a first optical transmitter 30 through a diffraction grating 31 to create a first diffraction pattern. Then, sequentially, as shown in FIG. 3B, light is diffracted from a second optical transmitter 40 through the same diffraction grating 31 to create a second diffraction pattern. Since the same diffraction grating is used to create the first and second diffractions patterns, the first and second diffraction patterns are the same. As with the example of FIGS. 2A and 2B, the first and second diffraction patterns may already be sufficiently offset from one another. This could be by virtue of the chosen alignment of the diffraction grating and the first and second optical transmitters, respectively. Alternatively, the second diffraction pattern may be offset further, for example, using a refracting lens. Finally, the output of the pixel is read out using time division multiplexing so that the effective resolution of the pixel is the combination of the resolutions of the first and second diffraction patterns.

FIGS. 4, 5 and 6 show some examples of different diffraction patterns according to fourth, fifth and sixth examples of the disclosure, respectively. These diffraction patterns are dot matrices formed by scattering light from a plurality of collimated lasers through diffraction gratings, depicted in FIGS. 4, 5 and 6 as patterns of letters for illustrative purposes.

In FIG. 4, a dots matrix depicted by a diffraction pattern of As is produced using a first optical transmitter and a diffraction grating lens, then dot matrices depicted by the diffraction patterns of Bs, Cs and Ds are produced sequentially after that using second, third and fourth optical transmitters, respectively. In this example, the diffraction pattern of Bs, Cs and Ds are created by diffracting light from the second, third and fourth optical transmitters through the same diffraction grating lens as used for creating the pattern of As from the first optical transmitter. In other examples, however, each diffraction pattern may be formed by diffracting light from optical transmitters through different diffraction grating lenses.

The patterns of As, Bs, Cs and Ds are each arranged in a square dot matrix, each being offset from one another so that a subset of the dot matrices (i.e. one A, one B, one C and one D) create a square sub-matrix, and together all of the As, Bs, Cs and Ds form a combined square dot matrix as illustrated in FIG. 4. It should be appreciated that the pattern as shown in FIG. 4 is only seen as a combined pattern in the read out stage, in which the active-pixel image sensor uses time division multiplexing to combine the patterns of the As, Bs, Cs and Ds so as to generate a high resolution output.

In the example of FIG. 4, each of the diffraction patterns of As, Bs, Cs and Ds are uniform, i.e. the individual dot matrices of As, Bs, Cs and Ds are each equally spaced. The combined diffraction pattern is also uniform, i.e. the combined dot matrix of As, Bs, Cs and Ds are equally spaced from one another.

In the example of FIG. 5, a similar diffraction pattern to FIG. 4 is produced with the exception that the pattern of Ds is omitted. However, although each of the diffraction patterns of As, Bs and Cs are uniform in FIG. 5 in the same way as the diffraction patterns of As, Bs and Cs are uniform in FIG. 4, the combined diffraction pattern is non-uniform. In other words, the combined dot matrix of As, Bs and Cs are not all equally spaced from one another. This effect is produced by offsetting the Bs and Cs to the right and below the As, respectively.

Now turning to FIG. 6, another example of a non-uniform combined diffraction pattern is shown. In FIG. 6, a dots matrix depicted by a diffraction pattern of As is produced using a first optical transmitter and a diffraction grating lens, then dot matrices depicted by the diffraction patterns of Bs, Cs, Ds, Es and Fs are produced sequentially after that using second, third, fourth, fifth and sixth optical transmitters, respectively. In this examples, the diffraction pattern of Bs, Cs, Ds, Es and Fs are created by diffracting light from the second, third, fourth, fifth and sixth optical transmitters through the same diffraction grating lens as used for creating the pattern of As from the first optical transmitter. In other examples, however, each diffraction pattern may be formed by diffracting light from optical transmitters through different diffraction grating lenses.

The patterns of As, of Bs, Cs, Ds, Es and Fs are offset from one another so that a subset of the dot matrices (i.e. one A, one B, one C, one D, one E and one F) create a hexagonal sub-matrix, and together all of the As, Bs, Cs, Ds, Es and Fs form a combined hexagonal dot matrix as illustrated in FIG. 6. It should be appreciated that the pattern as shown in FIG. 6 is only seen as a combined pattern in the read out stage, in which the active-pixel image sensor uses time division multiplexing to combine the patterns of the As, of Bs, Cs, Ds, Es and Fs so as to generate a high resolution output.

A hexagonal combined diffraction pattern, such as the one shown in FIG. 6, provides for high efficiency in terms of covering the entire field of view of the pixel output.

In the example of FIG. 6, the combined diffraction pattern is non-uniform, i.e. the combined dot matrix of As, of Bs, Cs, Ds, Es and Fs are not all equally spaced from one another.

Figure 7:
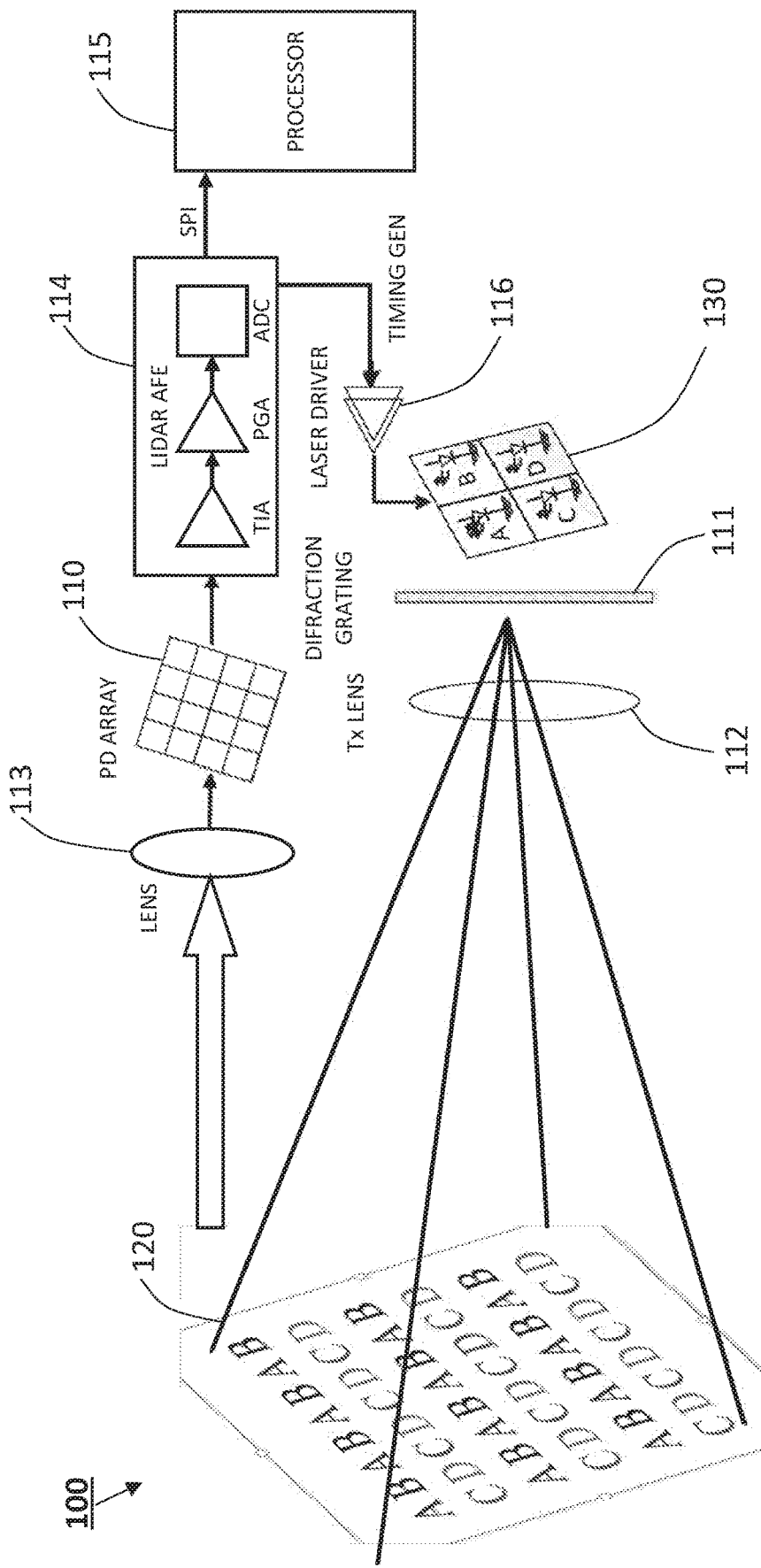
FIG. 7 shows an apparatus comprising an active-pixel image sensor in accordance with a seventh example of the present disclosure.

FIG. 7 shows an apparatus 100 comprising an active-pixel image sensor in accordance with a seventh example of the present disclosure, in which individual patterns 130 of As, Bs, Cs and Ds together form the combined dot matrix 120 of FIG. 4.

The apparatus comprises an active-pixel image sensor according to an example of the present disclosure, which has a plurality of optical transmitters 110 and a diffraction grating lens 111. The apparatus further comprises a transmission lens 112 to further reshape the pattern and its field of incidence in front of the diffraction grating lens 111, a receiver optical lens 113 to adjust the field of view of the image sensor matrix, an analog front end chip 114 for synchronizing the timing between optical transmitters 110 and digitalizing the analog signals from the image sensor, a system controller 115 for controlling the analog front end chip 114 and interfacing to cooperate with other upper level systems, such that a digital signal processor can merge the time division multiplexing images, and a laser driver 116.

EXAMPLES AND VARIATIONS

The present disclosure includes apparatuses which can include means to implement any one or more parts of the various techniques disclosed herein.

Example 1 is a method of increasing a resolution of an active-pixel image sensor, comprising: diffracting light from a first optical transmitter to create a first diffraction pattern; sequentially diffracting light from a second optical transmitter to create a second diffraction pattern; offsetting the second diffraction pattern spatially from the first diffraction pattern; and interleaving the first and second diffraction patterns using time division multiplexing to create a single pixel output.

In Example 2, the method in Example 1 can optionally include diffracting light from the first and second optical transmitters comprising diffracting light from each of the first and second optical transmitters through the same diffraction grating.

In Example 3, the method in Example 1 can optionally include diffracting light from the first and second optical transmitters comprising diffracting light from the first and second optical transmitters through different diffraction gratings.

In Example 4, the method in any one of Examples 1-3 can optionally include offsetting the second diffraction pattern from the first diffraction pattern comprising offsetting to create a combined diffraction pattern at the single pixel output that is uniform.

In Example 5, the method in any one of Examples 1-3 can optionally include offsetting the second diffraction pattern from the first diffraction pattern comprising offsetting to create a combined diffraction pattern at the single pixel output that is non-uniform.

Example 6 is an active-pixel image sensor, comprising: a first optical transmitter; a second optical transmitter; a diffraction grating; and optical transmitter control circuitry arranged to pass light from the first and second optical transmitters sequentially through the diffraction grating to create a first and second diffraction pattern, respectively, to offset the second diffraction pattern spatially from the first diffraction pattern, and to interleave the first and second diffraction patterns using time division multiplexing to create a single pixel output.

In Example 7, the sensor in Example 6 can optionally include the single pixel output comprising a combined diffraction pattern that is uniform.

In Example 8, the sensor in Example 6 can optionally include the single pixel output comprising a combined diffraction pattern that is non-uniform.

In Example 9, the sensor in any one of Examples 6-8 can optionally include the first and second diffraction patterns being quadrilateral.

In Example 10, the sensor in any one of Examples 6-8 can optionally include the first and second diffraction patterns being hexagonal.

In Example 11, the sensor in any one of Examples 6-10 can optionally include the first optical transmitter and the second optical transmitter being collimated lasers.

In Example 12, the sensor in any one of Examples 6-11 can optionally include the active-pixel image sensor being a solid state image sensor.

Example 13 is an active-pixel image sensor, comprising: a first optical transmitter; a second optical transmitter; a plurality of diffraction gratings; and optical transmitter control circuitry arranged to pass light from the first and second optical transmitters sequentially through the plurality of diffraction gratings to create a first and second diffraction pattern, respectively, to offset the second diffraction pattern spatially from the first diffraction pattern, and to interleave the first and second diffraction patterns using time division multiplexing to create a single pixel output.

In Example 14, the sensor in Example 13 can optionally include light from the first and second optical transmitters being passed through different diffraction gratings.

In Example 15, the sensor in Example 13 or 14 can optionally include the single pixel output comprising a combined diffraction pattern that is uniform.

In Example 16, the sensor in Example 13 or 14 can optionally include the single pixel output comprising the single pixel output comprising a combined diffraction pattern that is non-uniform.

In Example 17, the sensor in any one of Examples 13-16 can optionally include the first and second diffraction patterns being quadrilateral.

In Example 18, the sensor in any one of Examples 13-16 can optionally include the first and second diffraction patterns being hexagonal.

In Example 19, the sensor in any one of Examples 13-18 can optionally include the first optical transmitter and the second optical transmitter being collimated lasers.

In Example 20, the sensor in any one of Examples 13-19 can optionally include the active-pixel image sensor being a solid state image sensor.

The description herein relates to particularly preferred aspects of the disclosure, but it will be appreciated that other implementations are possible. Variations and modifications will be apparent to the skilled person, such as equivalent and other features which are already known and which may be used instead of, or in addition to, features described herein. Features that are described in the context of separate aspects or examples may be provided in combination in a single aspect or example. Conversely, features which are described in the context of a single aspect or example may also be provided separately or in any suitable sub-combination.

It is also imperative to note that all of the specifications, dimensions, and relationships outlined herein have only been offered for purposes of example and teaching only. Such information may be varied considerably without departing from the spirit of the present disclosure, or the scope of the appended claims (if any) and/or examples. The specifications apply only to one non-limiting example and, accordingly, they should be construed as such. In the foregoing description, example embodiments have been described with reference to particular component arrangements. Various modifications and changes may be made to such embodiments without departing from the scope of the appended claims (if any) and/or examples. The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components of the Figures may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the Figures and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Some of the disclosed functions may be deleted or removed where appropriate, or these operations may be modified or changed considerably without departing from the scope of the present disclosure. In addition, the timing of these operations may be altered considerably. The operational flows have been offered for purposes of example and discussion. Substantial flexibility is provided by embodiments described herein in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the disclosure. Note that all optional features of the apparatus described herein may also be implemented with respect to the method or process described herein and specifics in the examples may be used anywhere in one or more embodiments.

What is claimed is:

1. A method of increasing a resolution of an active-pixel image sensor, comprising:
    diffracting light from a first optical transmitter to create a first diffraction pattern;
    sequentially diffracting light from a second optical transmitter to create a second diffraction pattern;
    offsetting the second diffraction pattern spatially from the first diffraction pattern; and
    interleaving the first and second diffraction patterns using time division multiplexing to create a single pixel output.

2. The method according to claim 1, wherein diffracting light from the first and second optical transmitters comprises diffracting light from each of the first and second optical transmitters through the same diffraction grating.

3. The method according to claim 1, wherein diffracting light from the first and second optical transmitters comprises diffracting light from the first and second optical transmitters through different diffraction gratings.

4. The method according to claim 1, wherein offsetting the second diffraction pattern from the first diffraction pattern comprises offsetting to create a combined diffraction pattern at the single pixel output that is uniform.

5. The method according to claim 1, wherein offsetting the second diffraction pattern from the first diffraction pattern comprises offsetting to create a combined diffraction pattern at the single pixel output that is non-uniform.

6. An active-pixel image sensor, comprising:
a first optical transmitter;
a second optical transmitter;
a diffraction grating; and
optical transmitter control circuitry arranged to pass light from the first and second optical transmitters sequentially through the diffraction grating to create a first and second diffraction pattern, respectively, to offset the second diffraction pattern spatially from the first diffraction pattern, and to interleave the first and second diffraction patterns using time division multiplexing to create a single pixel output.

7. The active-pixel image sensor according to claim 6, wherein the single pixel output comprises a combined diffraction pattern that is uniform.

8. The active-pixel image sensor according to claim 6, wherein the single pixel output comprises a combined diffraction pattern that is non-uniform.

9. The active-pixel image sensor according to claim 6, wherein the first and second diffraction patterns are quadrilateral.

10. The active-pixel image sensor according to claim 6, wherein the first and second diffraction patterns are hexagonal.

11. The active-pixel image sensor according to claim 6, wherein the first optical transmitter and the second optical transmitter are collimated lasers.

12. The active-pixel image sensor according to claim 6, wherein the active-pixel image sensor is a solid state image sensor.

13. An active-pixel image sensor, comprising:
a first optical transmitter;
a second optical transmitter;
a plurality of diffraction gratings; and
optical transmitter control circuitry arranged to pass light from the first and second optical transmitters sequentially through the plurality of diffraction gratings to create a first and second diffraction pattern, respectively, to offset the second diffraction pattern spatially from the first diffraction pattern, and to interleave the first and second diffraction patterns using time division multiplexing to create a single pixel output.

14. The active-pixel image sensor according to claim 13, wherein light from the first and second optical transmitters is passed through different diffraction gratings.

15. The active-pixel image sensor according to claim 13, wherein the single pixel output comprises a combined diffraction pattern that is uniform.

16. The active-pixel image sensor according to claim 13, wherein the single pixel output comprises a combined diffraction pattern that is non-uniform.

17. The active-pixel image sensor according to claim 13, wherein the first and second diffraction patterns are quadrilateral.

18. The active-pixel image sensor according to claim 13, wherein the first and second diffraction patterns are hexagonal.

19. The active-pixel image sensor according to claim 13, wherein the first optical transmitter and the second optical transmitter are collimated lasers.

20. The active-pixel image sensor according to claim 13, wherein the active-pixel image sensor is a solid state image sensor.

* * * * *